United States Patent Office 2,898,157
Patented Aug. 4, 1959

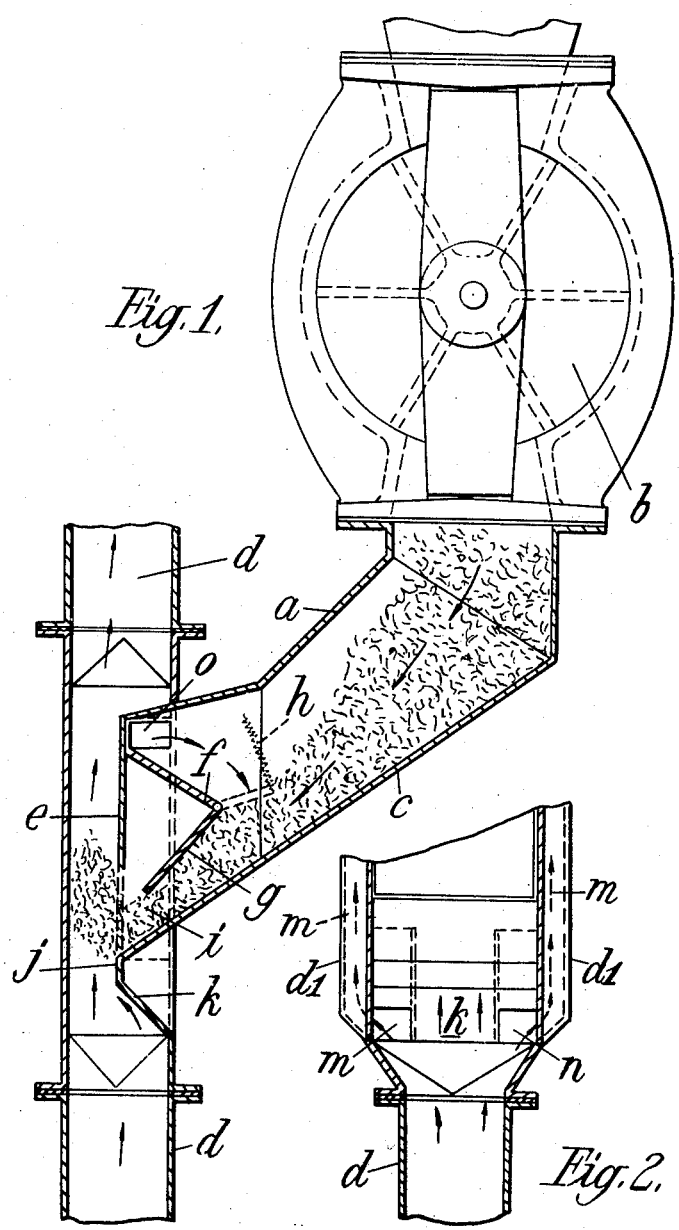

2,898,157

PNEUMATIC ELEVATORS FOR GRANULAR MATERIALS

Robert Hallworth, Cheadle, England, assignor to Henry Simon Limited, Stockport, England, a British company Application August 26, 1957, Serial No. 680,320

Claims priority, application Great Britain September 18, 1956

2 Claims. (Cl. 302—17)

This invention relates to pneumatic elevators for granular materials and particularly to pneumatic elevators for cereal grains, leguminous seeds, free flowing flour mill stocks and like materials hereinafter termed stock, the elevators being of a type in which elevation is effected up a vertical or substantially vertical pipe, to the bottom of which air pressure is applied, stock being delivered by a stock-duct from one or more processing machines or storage bins to an entrainment point or entrainment points built into the boundary walls of the elevating pipe, undue loss of air pressure at such entrainment points being prevented by the provision in each of the stock-ducts of a feeder seal usually of a rotary type.

In such equipment, however, stock discharged into a stock-duct from the pockets of a feeder seal is replaced by air drawn from the pneumatic system, such replacement air being transferred by the feeder into the stock hopper or equivalent. This air transference coupled with any leakage loss which might occur, for example, through the operational clearances between the rotor and stator of a rotary feeder seal, causes a flow of air from the elevating pipe along a stock-duct in the opposite direction to the stock flow, the air thus deflected from the elevating pipe carrying with it some of the stock from the entrainment point and causing turbulence within the stock layer thus retarding its flow and reducing the entrainment efficiency of the elevating system.

The object of the present invention is to provide simple and effective means to prevent retardation of stock during its passage from the feeder seal to the entrainment point and to ensure that entrained stock is not carried back in the stock-duct.

The invention comprises the provision in a stock duct through which material is led to an entrainment position in a stock elevating pipe, of means for preventing stock laden air from travelling backwards along the stock duct and means for establishing in said duct air pressure equal to or slightly greater than that obtaining in the elevating pipe so as to obviate any tendency of air to travel into said duct from the entrainment position.

The invention further comprises the arrangement of a spring loaded plate which rides lightly on the surface of the stock passing to the entrainment position, such plate acting in the manner of a non-return valve to resist any tendency for air from the elevating pipe to move stock up the duct.

Referring to the accompanying explanatory drawings:

Figure 1 is a sectional side elevation and Figure 2 a sectional front elevation of the lower portion of Figure 1 showing a stock elevating pipe fed from a rotary valve, arranged in one convenient form in accordance with this invention.

Figure 3:
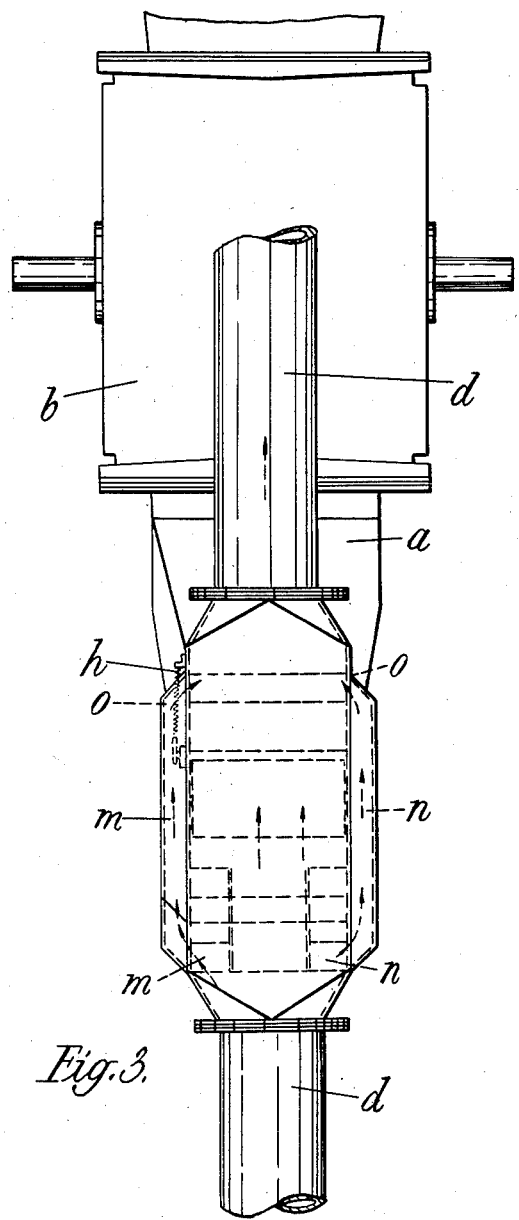
Figure 3 is an elevation looking from left to right of Figure 1.

In Figures 1–3 a tubular stock duct $a$ of substantially rectangular cross section is fed with stock by the rotary valve $b$ and is provided with an inclined flat base $c$ down which stock passes in an even layer of considerable width compared with its thickness. The outlet ends of the duct walls enter a recessed part of the elevating pipe as shown in Figure 1 and the boundary walls $d^1$ of the elevating pipe $d$ may be of rectangular cross-section as shown in Figure 2 with two of its side walls continuous with those of the duct $a$ and of such dimensions that the cross-sectional area of the rectangular section of the elevator pipe is equal to that of its normal cylindrical cross section above and below the point where the stock duct unites therewith.

The outlet end of the duct $a$ is partially closed by a baffle plate $e$ joining the extremities of the side walls and extending downwards from the top wall to the level of the top surface of stock layer of the maximum thickness. Hingeably mounted immediately adjacent to the lower extremity of a similar internal baffle $f$, which may be inclined so that its upper extremity joins the first baffle $e$, is a valve plate $g$ which extends the full width of the stock-duct and is biased by a spring $h$ so that its lower extremity rests lightly on the surface of the layer of stock $i$ irrespective of the height thereof, thus forming a closure extension of the internal baffle $f$ to prevent entrained stock from being returned or moving backwards to the stock-duct.

From a position in the elevating pipe before the entrainment point $j$ and preferably from an inwardly inclined face $k$ of the transformation section where the cross-section of the elevating pipe changes, air ducts $m$ and $n$ are arranged to connect with the stock-duct at positions as $o$ on the feeder side of the internal baffle $f$ so that an ample supply of air is available from the elevating pipe to meet losses through the feeder, due to the action of the rotary valve $b$, without additional air being induced through the stock layer.

It will be appreciated that the stock duct may receive stock from several feed units, each having a feeder seal preferably of the rotary type therein.

What I claim is:

1. A pneumatic elevator for granular materials in which stock received through a rotary seal is fed by a downwardly sloping stock duct to an entrainment position in a vertical elevating pipe, said duct projecting into the elevating pipe which has a set-in part to which the said stock duct is secured, air passing up the elevating pipe beneath the entrainment position in part passing into the entrainment position and in part passing on opposite sides of the stock duct where it (the stock duct) projects into the elevating pipe, such latter part of the elevating air having access to the interior of the stock duct at its upper part where it comes inside the normal dimensions of the elevating pipe in order to establish in the stock duct an air pressure equal to or slightly greater than that obtaining in the elevating pipe at the entrainment position, and means being provided in said stock duct for preventing stock-laden air from travelling backwards from the elevating pipe along the stock duct, which means includes a spring loaded plate which rides lightly on the surface of the stock passing to the entrainment position.

2. A pneumatic elevator as claimed in claim 1 wherein said plate is pivotally attached to an internal baffle in the stock duct, the said latter part of the elevating air having access to the stock duct adjacent the top of the baffle.

References Cited in the file of this patent

UNITED STATES PATENTS

| 1,454,979 | Muhlfeld | May 15, 1923 |
| 1,745,195 | Thurmond | Jan. 28, 1930 |
| 2,244,050 | Cassiere | June 3, 1941 |